3,056,816
PROCESS FOR CONVERTING 3β-HYDROXY-Δ⁵ STEROIDS TO 3-KETO-Δ⁴ STEROIDS
Rudolph G. Berg, Groton, Conn., assignor to Chas. Pfizer & Co., Inc., New York, N.Y., a corporation of Delaware
No Drawing. Filed Mar. 20, 1961, Ser. No. 96,699
6 Claims. (Cl. 260—397.47)

This application is concerned with a new and useful method of converting 3β-hydroxy-Δ⁵-steroid compounds to the corresponding 3-keto-Δ⁴-steroids. More especially it is concerned with a unique and valuable procedure whereby 3β-hydroxy-Δ⁵-androstenes and pregnenes are converted to the corresponding 3-keto-Δ⁴-compounds under extremely mild conditions without attacking other oxidation sensitive groups which may be present on the molecule.

Heretofore, the conversion of 3β-hydroxy-Δ⁵-steroids to the desirable 3-keto-Δ⁴-steroids has been accomplished by dihalogenating the substrate, oxidizing to form a 3-keto-5,6-dihalo steroid and subsequently removing the halogen atoms with, for example, metallic zinc or sodium iodide. This generally produces a 3-keto-Δ⁵-steroid which must be isomerized to the Δ⁴-compound. The major disadvantage of this procedure is that any groups present on the molecule which are sensitive to oxidation are oxidized along with the 3-hydroxyl group. Hydroxyl groups at the 11- or 21-position are typical of oxidizable groups which would be attacked by the oxidizing agent used to convert a 3β-hydroxyl group to a 3-keto group.

It has now been discovered that, provided certain critical conditions are employed, it is possible to convert 3β-hydroxy-5α,6β-dichloro steroids directly to the corresponding Δ⁴-3-keto steroids in good yield by a non-oxidative procedure. Besides the obvious advantage of eliminating the oxidation step of the classical approach to these compounds, this process also has the advantage of eliminating the necessity of protecting oxidation sensitive groups. While the process would be used to convert 3β-hydroxy-Δ⁵-steroids to 3-keto-Δ⁴-steroids, the essence of the invention is the finding of a non-oxidative method of converting 3β-hydroxy-5α,6β-dihalo steroids to the corresponding 3-keto-Δ⁴-steroids.

In practicing this invention, the steroid substrate is reacted with lithium chloride in a solvent selected from the group consisting of dimethylformamide, diethylformamide and dimethylacetamide at a temperature of at least about 50° C. The amount of lithium chloride is not critical. In fact it may be present in anything from catalytic amounts, that is about 1% by weight to as high as a 100% molar excess or even higher. The only limit to the amount which can be employed is the capacity of the selected solvent to dissolve the lithium chloride. As a practical matter from about 0.3 g. to about 1.0 g. of lithium chloride will be employed for each gram of steroid subtrate.

The preferred solvent is dimethylformamide because it is readily available and gives satisfactory yields.

The time of reaction is not critical since some product forms almost immediately upon mixing the reactants at the selected temperature. Naturally, higher temperatures favor a more rapid reaction. Reaction times as short as ten minutes or as long as a month will give good yields. Practically it is found that the reaction is most feasible from an economic viewpoint if the reaction time is in the range of from about one to about sixteen hours.

The lower temperature limit is 50° C. although undoubtedly some reaction takes place at even lower temperatures. The upper limit is the boiling point of the selected solvent. The highest boiling useful solvent is diethylformamide which at atmospheric pressure boils at 177–8° C. The preferred temperature range is from about 75 to about 120° C. since this gives good yields within a practical time period.

The use of an inert atmosphere, for example, a nitrogen atmosphere, will decrease the possibility of side reactions. An inert atmosphere is not necessary, however.

The desired product is isolated from the reaction mixture by standard means. The simplest procedure is to wash the solvent mixture with water and extract with a suitable solvent, for example, a halogenated organic solvent containing up to two carbon atoms such as chloroform, methylene chloride, or ethylene chloride. The extract is dried over an anhydrous drying agent, filtered and the desired product recovered by evaporating the solvent in vacuo. Alternatively, the solvent can be evaporated, the residue washed with water and the remaining water insoluble product recovered and dried. Purification may be effected by recrystallization from a suitable solvent. Other recovery means will be apparent to those skilled in the art.

Typical substrates which can be utilized in the process of this invention include the 5,6-dichloro derivatives of:

16α,17α-oxido-Δ⁵-pregnene-3β-ol-20-one
Δ⁵-pregnene-3β-ol-20-one
Δ⁵-pregnene-3β,20β-diol
Δ⁵-pregnene-3β,21-diol-11,20-dione
Δ⁵-pregnene-3β,17α-diol-20-one
Δ⁵-pregnene-3β,21-diol-20-one
Δ⁵-pregnene-3β,17α,20α21-tetrol
Δ⁵-pregnene-3β,16α,20α-triol
Δ⁵-pregnene-3β,17α,21-triol-3,20-dione
Δ⁵-androstene-3β,17β-diol
Δ⁵-androstene-3β,17β-diol-16-one
Δ⁵-androstene-3β,16α,17β-triol All of these compounds are converted to the corresponding 5α,6β-dichloro compounds by standard means well-known in the art. It should be mentioned that 16,17-epoxido compounds are converted to the corresponding 16-chloro-17-hydroxy compound during the course of the reaction. The epoxide moiety can be readily regenerated, however, by treatment with an alkaline reagent by well known procedures. The most practical application of the invention is to the preparation of androstenes and pregnenes, including nor-compounds and methyl substituted compounds, that is to steroid compounds containing from 18 to 22 carbon atoms.

A most important application of this invention is the conversion of the readily available Δ⁵-pregnene-3β,17α,21-triol-3,20-one to the commercially important Δ⁴-pregnene-17α,21-diol-3,20-dione. This latter compound, as is well known, is a useful industrial intermediate for the preparation of hydrocortisone, cortisone, prednisolone, prednisone, and other therapeutically important steroids. In carrying out this reaction, the steroid compound is first converted to a 3,17-diacylate and then to 5α,6β-dichloro-pregnane-3β,17α,-21-triol-20 - one 3,21-diacylate under standard conditions. Hydrolysis of the acyl groups using either acid or basic hydrolysis according to well known methods, converts this compound to the corresponding triol. Application of the process of this invention produces the desired compound.

As is well known, 3β-hydroxy-Δ⁵-steroid conditions are best converted to 5,6-dichloro compound if the 3β-hydroxy group is first esterified. Almost any acyl group is applicable to the preparation of the ester. The preferred are those containing only carbon, hydrogen and oxygen up to a total of six carbon atoms. These would include the acetyl group, the propionyl group and the benzoyl group. These are preferred since they are the most readily available and can be readily hydrolyzed to form free hydroxyl groups.

The following examples are given solely for the purpose of illustration and are not to be construed as limitations of this invention, many apparent variations of which are possible without departing from the spirit or scope thereof.

PREPARATION OF DICHLORO COMPOUNDS

Dichloro compounds used in the process of this invention may be prepared in the following manner.

It will be apparent, however, to those skilled in the art that other methods for their preparation are available.

A total of 10 g. of $\Delta^5$-pregnene-3$\beta$,17$\alpha$,21-triol-3,20-dione 3,21-diacetate was dissolved in 50 ml. of methylene chloride containing 2 ml. of pyridine. A 23% excess of molecular chlorine dissolved in 45 ml. of carbon tetrachloride and pre-cooled to approximately 10° C. was added while maintaining the temperature between —40 and —50° C. This required approximately 8 minutes. The mixture was allowed to warm to approximately —20° C. and extracted with 6% aqueous hydrochloric acid. It was then extracted with water. In each case, equal volumes of extraction liquid were employed and these were themselves extracted with equal volumes of fresh methylene chloride. The combined methylene chloride layers were steam distilled and the resulting slurry filtered. The precipitate was washed with water and aqueous methanol. It was again filtered and the filter cake washed with fresh methanol. The product was purified by recrystallization from acetone.

This procedure was applied to the preparation of formate, acetate, propionate, and benzoate monoesters and polyesters used in the process of this invention.

The following illustrates one of the procedures applicable to the hydrolysis of esters.

A mixture of 25 g. of the steroid substrate in 2 liters of methanol was cooled to 10° C. and a solution of 25 g. of potassium hydroxide in 500 ml. of methanol previously cooled to 10° C. was added in an atmosphere of nitrogen. The mixture was stirred and allowed to come to room temperature. The resulting homogeneous solution was neutralized with glacial acetic acid approximately two hours after addition of the potassium hydroxide. Most of the solvent was removed under reduced pressure and the desired product was precipitated by the addition of water. It was collected by filtration.

Acid hydrolysis procedures are also applicable. For example, one can employ 10% hydrochloric acid in aqueous methanol solution permitting the reaction mixture to stand for from about 2 to about 10 hours. The resulting free hydroxy compound can be obtained after neutralization of the acid, for example, with aqueous sodium bicarbonate by removing the solvent in vacuo and washing the residue with water.

EXAMPLE I $\Delta^4$-Pregnene-3,20-Dione

A mixture of 0.44 g. of 5$\alpha$,6$\beta$-dichloro-pregnane-3$\beta$-ol-20-one, 1.1 ml. of dimethylformamide and 0.135 g. of lithium chloride was heated with stirring under a nitrogen atmosphere at approximately 110° C. for two hours. The mixture was cooled to room temperature and an equal volume of water was added. The mixture was extracted three times with 3 ml. portions of methylene chloride and the combined extracts were dried over magnesium sulfate, filtered, and evaporated to dryness. The product was crystallized from isopropyl ether to obtain a 69% yield of the desired product. It was recrystallized to a constant melting point of 133–134° C., identical with authentic $\Delta^4$-pregnene-3,20-dione prepared by another method.

EXAMPLE II

16$\alpha$,17$\alpha$-Oxido-$\Delta^4$-Pregnene-3,20-Dione

A mixture of 3 g. of 5$\alpha$,6$\beta$-dichloro-16$\alpha$,17$\alpha$-oxido-pregnane-3$\beta$-ol-20-one, 30 ml. of dimethylformamide and 0.93 g. of lithium chloride was heated with stirring to about 110° for two hours. The mixture was cooled and treated with water to precipitate 16$\beta$-chloro-$\Delta^4$-pregnene-17$\alpha$-ol-3,20-dione. The gummy precipitate was collected and extracted with methylene chloride. The extracts were concentrated and the residue dissolved in methanol. The basicity of the mixture was adjusted to pH 12 with dilute aqueous potassium hydroxide whereupon the desired product crystallized from solution. It was recrystallized from methanol to a constant melting point of 210–212° C., identical with an authentic specimen prepared by another method.

EXAMPLE III $\Delta^4$-Pregnene-21-Ol-3,11,20-Trione

A mixture of 1 g. of 5$\alpha$,6$\beta$-dichloro-pregnane-3$\beta$,21-diol-11,20-dione, 3 ml. of diethylacetamide and 0.3 g. of lithium chloride was heated with stirring at the reflux temperature for ten minutes. The mixture was cooled to room temperature and an equal volume of water was added. The mixture was extracted three times with 5 ml. portions of chloroform and the combined extracts were dried over magnesium sulfate, filtered, and evaporated to dryness to leave the desired product as a residue.

EXAMPLE IV $\Delta^4$-Pregnene-17$\alpha$-Ol-3,20-Dione

A mixture of 1 g. of 5$\alpha$,6$\beta$-dichloro-pregnane-3$\beta$,17$\alpha$-diol-20-one, 2 ml. of dimethylformamide and 1 g. of lithium chloride was heated with stirring under a nitrogen atmosphere at approximately 120° C. for three hours. The mixture was cooled to room temperature and an equal volume of water was added. The mixture was extracted three times with 5 ml. portions of methylene chloride and the combined extracts were dried over magnesium sulfate, filtered, and evaporated to dryness to leave the desired product as a residue.

EXAMPLE V $\Delta^4$-Androstane-17$\beta$-Ol-3-One

A mixture of 1 g. of 5$\alpha$,6$\beta$-dichloro-androstane-3$\beta$,17$\beta$-diol, 3 ml. of diethylformamide and 0.4 g. of lithium chloride was heated with stirring at approximately 100° C. for two hours. The mixture was cooled to room temperature and an equal volume of water was added. The mixture was extracted three times with 5 ml. portions of ethylene chloride and the combined extracts were dried over magnesium sulfate, filtered, and evaporated to dryness to leave the desired product as a residue.

EXAMPLE VI $\Delta^4$-Androstane-16$\alpha$,17$\beta$-Diol-3-One

A mixture of 1 g. of 5$\alpha$,6$\beta$-dichloro-androstane-3$\beta$,16$\alpha$,17$\beta$-triol, 4 ml. of diethylacetamide and 0.01 g. of lithium chloride was heated with stirring under a nitrogen atmosphere at the reflux temperature for one hour. The mixture was cooled to room temperature and an equal volume of water was added. The mixture was extracted three times with 5 ml. portions of chloroform and the combined extracts were dried over magnesium sulfate, filtered, and evaporated to dryness to leave the desired product as a residue.

EXAMPLE VII $\Delta^4$-Pregnene-17$\alpha$,21-Diol-3,20-Dione

A mixture of 1 g. of 5$\alpha$,6$\beta$-dichloropregnane-3$\beta$,17$\alpha$,21-triol-20-one, 2 ml. of dimethylformamide and 1 g. of lithium chloride was heated with stirring under a nitrogen atmosphere at approximately 120° C. for three hours. The mixture was cooled to room temperature and an equal volume of water was added. The mixture was extracted three times with 5 ml. portions of methylene chloride and the combined extracts were dried over magnesium sulfate, filtered, and evaporated to dryness to leave the desired product as a residue.

What is claimed is:

1. A process for the preparation of a compound selected from the group consisting of 3-keto-$\Delta^4$-androstenes and 3-keto-$\Delta^4$-pregnenes which comprises reacting a compound selected from the group consisting of 3$\beta$-hydroxy-5$\alpha$,6$\beta$-dichloro-androstanes and 3$\beta$-hydroxy-5$\alpha$,6$\beta$-dichloro-pregnanes with at least 1% by weight of lithium chloride, based on the weight of steroid substrate used, in a solvent selected from the group consisting of dimethylformamide, diethylformamide, and dimethylacetamide at a temperature of at least 50° C.

2. A process as in claim 1 wherein the solvent is dimethylformamide.

3. A process as in claim 1 wherein reaction takes place at a temperature of from about 75 to about 120° C. for a period of from about 1 to about 16 hours.

4. A process as in claim 1 wherein reaction takes place in an inert atmosphere.

5. A process for the preparation of $\Delta^4$-pregnene-17$\alpha$,21-diol-3,20-dione which comprises reacting 5$\alpha$,6$\beta$-dichloro-pregnane-3$\beta$,17$\alpha$,21-triol-20-one with at least 1% by weight of lithium chloride, based on the weight of steroid substrate used, in a solvent selected from the group consisting of dimethylformamide, diethylformamide, and dimethylacetamide at a temperature of at least 50° C.

6. A process for the preparation of a compound selected from the group consisting of 3-keto-$\Delta^4$-androstenes and 3-keto-$\Delta^4$-pregnenes which comprises first converting a compound selected from the group consisting of 3$\beta$-hydroxy-$\Delta^5$-androstene 3-acylates and 3$\beta$-hydroxy-$\Delta^5$-pregnene 3-acylates wherein an acyl group contains only carbon, hydrogen and oxygen up to a total of six carbon atoms to the corresponding 5$\alpha$,6$\beta$-dichloro compound, hydrolyzing the acylate group to form the corresponding 3$\beta$-hydroxy compound, and reacting the thus formed compound with at least 1% by weight of lithium chloride, based on the weight of steroid substrate used, in a solvent selected from the group consisting of dimethylformamide, diethylformamide, and dimethylacetamide at a temperature of at least 50° C.

No references cited.

UNITED STATES PATENT OFFICE
CERTIFICATE OF CORRECTION

Patent No. 3,056,816                            October 2, 1962

Rudolph G. Berg

It is hereby certified that error appears in the above numbered patent requiring correction and that the said Letters Patent should read as corrected below.

Column 2, line 32, for "-3,20-dione" read -- -20-one --; line 50, for "triol-3,20-" read -- triol-20- --; column 3, lines 11 and 12, for "-triol-3,20-dione" read -- -triol-20-one --.

Signed and sealed this 14th day of April 1964.

(SEAL)
Attest:

ERNEST W. SWIDER

Attesting Officer

EDWARD J. BRENNER

Commissioner of Patents